(12) United States Patent
Kobrosly et al.

(10) Patent No.: US 7,207,035 B2
(45) Date of Patent: Apr. 17, 2007

(54) APPARATUS AND METHOD FOR CONVERTING AN INSTRUCTION AND DATA TRACE TO AN EXECUTABLE PROGRAM

(75) Inventors: Walid Kobrosly, Round Rock, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 09/935,415

(22) Filed: Aug. 23, 2001

(65) Prior Publication Data

US 2003/0101436 A1 May 29, 2003

(51) Int. Cl.
*G06F 9/44* (2006.01)
*G06F 9/45* (2006.01)

(52) U.S. Cl. ............... 717/128; 717/131; 717/135; 703/22

(58) Field of Classification Search ........ 717/127–162; 703/22

See application file for complete search history.

(56) References Cited

U.S. PATENT DOCUMENTS

| | | | | |
|---|---|---|---|---|
| 5,926,395 A | * | 7/1999 | Mangelsdorf | 703/15 |
| 5,944,841 A | * | 8/1999 | Christie | 714/38 |
| 6,240,509 B1 | * | 5/2001 | Akkary | 712/228 |
| 6,243,836 B1 | * | 6/2001 | Whalen | 714/45 |
| 6,314,511 B2 | * | 11/2001 | Levy et al. | 712/217 |
| 6,463,582 B1 | * | 10/2002 | Lethin et al. | 717/158 |
| 6,487,715 B1 | * | 11/2002 | Chamdani et al. | 717/154 |
| 6,625,572 B1 | * | 9/2003 | Zemlyak et al. | 703/19 |
| 6,804,814 B1 | * | 10/2004 | Ayers et al. | 717/135 |

OTHER PUBLICATIONS

Garey & Johnson, "Computers and Intractability A Guide to the Theory of NP-Completeness", New York: Freeman & Co. (1979), p. 263.

Cormen, Leiserson, and Rivest, "Introduction to Algorithms", MIT Press (1990), pp. 916-938.

* cited by examiner

*Primary Examiner*—Tuan Dam
*Assistant Examiner*—Chuck Kendall
(74) *Attorney, Agent, or Firm*—Duke W. Yee; Gregory M. Doudnikoff; Gerald H. Glanzman

(57) ABSTRACT

An apparatus and method for converting an instruction and data trace to an executable program are provided. The apparatus and method are used to convert an instruction and data trace to an executable binary program that may then be used on a new computer system such that the simulations and the final computer both have similar run characteristics for a true comparison. The apparatus and method traverse a linear sequence of trace instructions to replace register names with unique labels and propagate these unique labels through the trace instructions. Thereafter, the trace instructions are traversed in a reverse direction to calculate register values based on the value of conditional branch registers. The resulting register values and corresponding memory addresses are then assembled into an executable program.

34 Claims, 7 Drawing Sheets

```
Source Code
main() {
int a=0;
int i;
int h=3;
for (i=0;i<h;i++) {a=i*h;}
}
```

FIG. 7

Execution Trace (the preamble trace that sets r1 and other system parameters is removed for brevity)

| Trace | | | mnemonics for explanation only | | |
|---|---|---|---|---|---|
| Inst addr | Instr | Mem addr | | | |
| 0x10000340 | 9421ffb0 | 0xf8000080 | (main) | stu | r1,80(r1) |
| 0x10000344 | 38600000 | | (main+0x4) | lil | r3,0x0 |
| 0x10000348 | 90610040 | 0xf8000040 | (main+0x8) | st | r3,0x40(r1) |
| 0x1000034c | 80610084 | 0xf8000084 | (main+0xc) | l | r4,84(r1) |
| 0x10000350 | 90810048 | 0xf8000048 | (main+0x10) | st | r4,0x48(r1) |
| 0x10000354 | 90610044 | 0xf8000044 | (main+0x14) | st | r3,0x44(r1) |
| 0x10000358 | 80610044 | 0xf8000044 | (main+0x18) | l | r3,0x44(r1) |
| 0x1000035c | 80810048 | 0xf8000048 | (main+0x1c) | l | r4,0x48(r1) |
| 0x10000360 | 7c032000 | | (main+0x20) | cmp | cr0,r3,r4 |
| 0x10000364 | 40800030 | | (main+0x24) | beq | 0x10000394 |
| (main+0x54) | | | | | |
| 0x10000368 | 80610044 | 0xf8000044 | (main+0x28) | l | r3,0x44(r1) |
| 0x1000036c | 80810048 | 0xf8000048 | (main+0x2c) | l | r4,0x48(r1) |
| 0x10000370 | 7c6321d6 | | (main+0x30) | muls | r3,r3,r4 |
| 0x10000374 | 90610040 | 0xf8000040 | (main+0x34) | st | r3,0x40(r1) |
| 0x10000378 | 80610044 | 0xf8000044 | (main+0x38) | l | r3,0x44(r1) |
| 0x1000037c | 38630001 | | (main+0x3c) | cal | r3,0x1(r3) |
| 0x10000380 | 90610044 | 0xf8000044 | (main+0x40) | st | r3,0x44(r1) |
| 0x10000384 | 80610044 | 0xf8000044 | (main+0x44) | l | r3,0x44(r1) |
| 0x10000388 | 80810048 | 0xf8000048 | (main+0x48) | l | r4,0x48(r1) |
| 0x1000038c | 7c032000 | | (main+0x4c) | cmp | cr0,r3,r4 |
| 0x10000390 | 4180ffd8 | | (main+0x50) | bne | 0x10000368 |
| (main+0x28) | | | | | |
| 0x10000368 | 80610044 | 0xf8000044 | (main+0x28) | l | r3,0x44(r1) |
| 0x1000036c | 80810048 | 0xf8000048 | (main+0x2c) | l | r4,0x48(r1) |
| 0x10000370 | 7c6321d6 | | (main+0x30) | muls | r3,r3,r4 |
| 0x10000374 | 90610040 | 0xf8000040 | (main+0x34) | st | r3,0x40(r1) |
| 0x10000378 | 80610044 | 0xf8000044 | (main+0x38) | l | r3,0x44(r1) |
| 0x1000037c | 38630001 | | (main+0x3c) | cal | r3,0x1(r3) |
| 0x10000380 | 90610044 | 0xf8000044 | (main+0x40) | st | r3,0x44(r1) |
| 0x10000384 | 80610044 | 0xf8000044 | (main+0x44) | l | r3,0x44(r1) |
| 0x10000388 | 80810048 | 0xf8000048 | (main+0x48) | l | r4,0x48(r1) |
| 0x1000038c | 7c032000 | | (main+0x4c) | cmp | cr0,r3,r4 |
| 0x10000390 | 4180ffd8 | | (main+0x50) | bne | 0x10000368 |
| (main+0x28) | | | | | |
| 0x10000394 | 38600000 | | (main+0x54) | lil | r3,0x0 |
| 0x10000398 | 48000004 | | (main+0x58) | b | 0x1000039c |
| (main+0x5c) | | | | | |
| 0x1000039c | 38210050 | | (main+0x5c) | cal | r1,0x50(r1) |
| 0x100003a0 | 4e800020 | | (main+0x60) | br | |

Relabeled trace shown in mnemonic form only

```
tracei: 0x10000340 (main)      9421ffb0  stu   N00001,80(r1)
tracei: 0x10000344 (main+0x4)  38600000  lil   N00003,0x0
tracei: 0x10000348 (main+0x8)  90610040  st    N00003,N00004
tracei: 0x1000034c (main+0xc)  80610084  l     N00005,N00006
tracei: 0x10000350 (main+0x10) 90810048  st    N00005,N00007
tracei: 0x10000354 (main+0x14) 90610044  st    N00003,N00008
tracei: 0x10000358 (main+0x18) 80610044  l     N00009,N00008
tracei: 0x1000035c (main+0x1c) 80810048  l     N00010,N00007
tracei: 0x10000360 (main+0x20) 7c032000  cmp   N00011,N00009,N00010
tracei: 0x10000364 (main+0x24) 40800030  beq   0x10000394 (main+0x54)
tracei: 0x10000368 (main+0x28) 80610044  l     N00012,N00008
tracei: 0x1000036c (main+0x2c) 80810048  l     N00013,N00007
tracei: 0x10000370 (main+0x30) 7c6321d6  muls  N00014,N00012,N00013
tracei: 0x10000374 (main+0x34) 90610040  st    N00014,N00004
tracei: 0x10000378 (main+0x38) 80610044  l     N00015,N00008
tracei: 0x1000037c (main+0x3c) 38630001  cal   N00016,0x1(N00015)
tracei: 0x10000380 (main+0x40) 90610044  st    N00016,N00008
tracei: 0x10000384 (main+0x44) 80610044  l     N00017,N00008
tracei: 0x10000388 (main+0x48) 80810048  l     N00018,N00007
tracei: 0x1000038c (main+0x4c) 7c032000  cmp   N00019,N00017,N00018
tracei: 0x10000390 (main+0x50) 4180ffd8  bne   0x10000368 (main+0x28)
tracei: 0x10000368 (main+0x28) 80610044  l     N00020,N00008
tracei: 0x1000036c (main+0x2c) 80810048  l     N00021,N00007
tracei: 0x10000370 (main+0x30) 7c6321d6  muls  N00022,N00020,N00021
tracei: 0x10000374 (main+0x34) 90610040  st    N00022,N00004
tracei: 0x10000378 (main+0x38) 80610044  l     N00023,N00008
tracei: 0x1000037c (main+0x3c) 38630001  cal   N00024,0x1(N00023)
tracei: 0x10000380 (main+0x40) 90610044  st    N00024,N00008
tracei: 0x10000384 (main+0x44) 80610044  l     N00025,N00008
tracei: 0x10000388 (main+0x48) 80810048  l     N00026,N00007
tracei: 0x1000038c (main+0x4c) 7c032000  cmp   N00027,N00025,N00026
tracei: 0x10000390 (main+0x50) 4180ffd8  bne   0x10000368 (main+0x28)
tracei: 0x10000394 (main+0x54) 38600000  lil   N00028,0x0
tracei: 0x10000398 (main+0x58) 48000004  b     0x1000039c (main+0x5c)
tracei: 0x1000039c (main+0x5c) 38210050  cal   N00030,N00029
tracei: 0x100003a0 (main+0x60) 4e800020  br
```

FIG. 8

Assembled Program

| | | | |
|---|---|---|---|
| 0x10000340 | 9421ffb0 | stu | r1,80(r1) |
| 0x10000344 | 38600000 | lil | r3,0x0 |
| 0x10000348 | 90610040 | st | r3,0x40(r1) |
| 0x1000034c | 80610084 | l | r4,84(r1) |
| 0x10000350 | 90810048 | st | r4,0x48(r1) |
| 0x10000354 | 90610044 | st | r3,0x44(r1) |
| 0x10000358 | 80610044 | l | r3,0x44(r1) |
| 0x1000035c | 80810048 | l | r4,0x48(r1) |
| 0x10000360 | 7c032000 | cmp | cr0,r3,r4 |
| 0x10000364 | 40800030 | beq | 0x10000394 (main+0x54) |
| 0x10000368 | 80610044 | l | r3,0x44(r1) |
| 0x1000036c | 80810048 | l | r4,0x48(r1) |
| 0x10000370 | 7c6321d6 | muls | r3,r3,r4 |
| 0x10000374 | 90610040 | st | r3,0x40(r1) |
| 0x10000378 | 80610044 | l | r3,0x44(r1) |
| 0x1000037c | 38630001 | cal | r3,0x1(r3) |
| 0x10000380 | 90610044 | st | r3,0x44(r1) |
| 0x10000384 | 80610044 | l | r3,0x44(r1) |
| 0x10000388 | 80810048 | l | r4,0x48(r1) |
| 0x1000038c | 7c032000 | cmp | cr0,r3,r4 |
| 0x10000390 | 4180ffd8 | bne | 0x10000368 (main+0x28) |
| 0x10000394 | 38600000 | lil | r3,0x0 |
| 0x10000398 | 48000004 | b | 0x1000039c (main+0x5c) |
| 0x1000039c | 38210050 | cal | r1,0x50(r1) |
| 0x100003a0 | 4e800020 | br | |

FIG. 9

APPARATUS AND METHOD FOR CONVERTING AN INSTRUCTION AND DATA TRACE TO AN EXECUTABLE PROGRAM

BACKGROUND OF THE INVENTION

1. Technical Field

The present invention is directed to an improved data processing system. More specifically, the present invention is directed to an apparatus and method for converting an instruction and data trace to an executable program.

2. Description of Related Art

Trace driven simulation is a well accepted practice to analyze processor and computer system performance during design. The instruction and data trace is generally created by recording the execution of a program on an existing computer system that is configured with the required devices, operating system, the various software middleware, and the data set. For extensive benchmark applications, such as large databases, it takes an extensive effort to do the system configuration and setup the data sets for collection of the traces.

However, once the traces are used in the simulation, no more use of these traces is made in analyzing the final product because the traces are only a sequential trace of the instructions while the finished computer system requires a computer program to be run over it's operating system. This results in a long delay to setup the system to rerun the initial benchmark in totality. In the related art, it takes an extensive time and effort to set up the system configuration and collect the traces. The work effort is repeated once the systems configuration is changed. In other words, the collected traces are not re-usable.

Take the example of rerunning a database benchmark. This involves, setting up various disk drive partitions, loading the database tables, etc., which all may take up at least a week of effort before the benchmarks can be run. It would be beneficial to get an immediate first cut analysis of new hardware in terms of benchmarks as soon as the operating system is booted. However, at this early a stage in development, it's also likely that all the drivers are not even functional and even the database application may also not be runnable due to the beta level of the operating system.

Furthermore, rerunning the initial benchmark the second time around may not result in similar execution sequence due to the system load variations, etc. that will not yield an accurate comparison. Thus, it would be beneficial to have an apparatus and method for converting an instruction and data trace to an executable binary program that may be used to recreate and rerun a trace of a computer program.

SUMMARY OF THE INVENTION

The present invention provides an apparatus and method for converting an instruction and data trace to an executable program. The apparatus and method are used to convert an instruction and data trace to an executable binary program that may then be used on a new computer system such that the simulations and the final computer both have similar run characteristics for a true comparison. The present invention traverses a linear sequence of trace instructions to replace register names with unique labels and propagate these unique labels through the trace instructions. Thereafter, the trace instructions are traversed in a reverse direction to calculate register values based on the value of conditional branch registers. The resulting register values and corresponding memory addresses are then assembled into an executable program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an example of trace data for the source code in FIG. 6;

FIG. 8 is an example of relabeled trace data corresponding to the trace data in FIG. 7, according to the present invention;

FIG. 9 is an example of the assemble program obtained as a result of the operation of the present invention on the relabeled trace data in FIG. 8.

DETAILED DESCRIPTION OF THE PREFERRED EMBODIMENT

Figure 1:
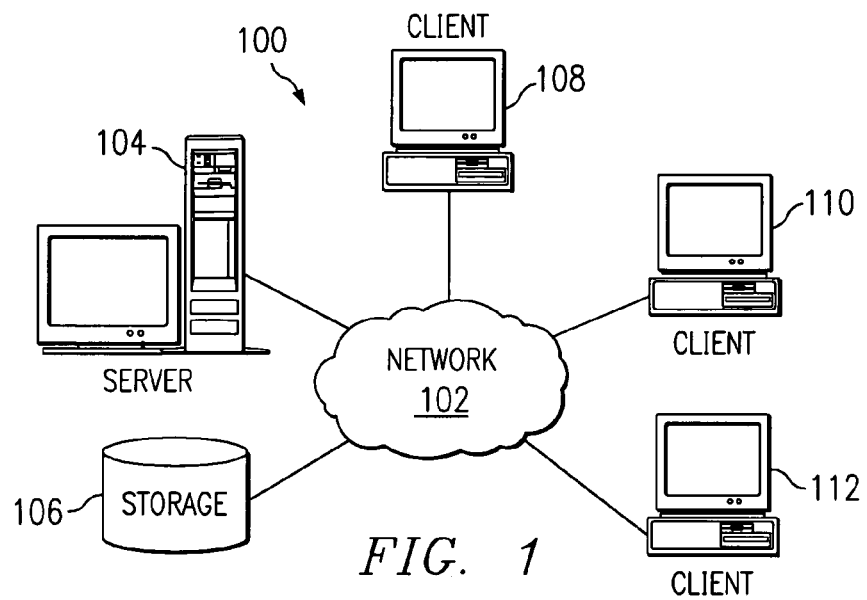
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
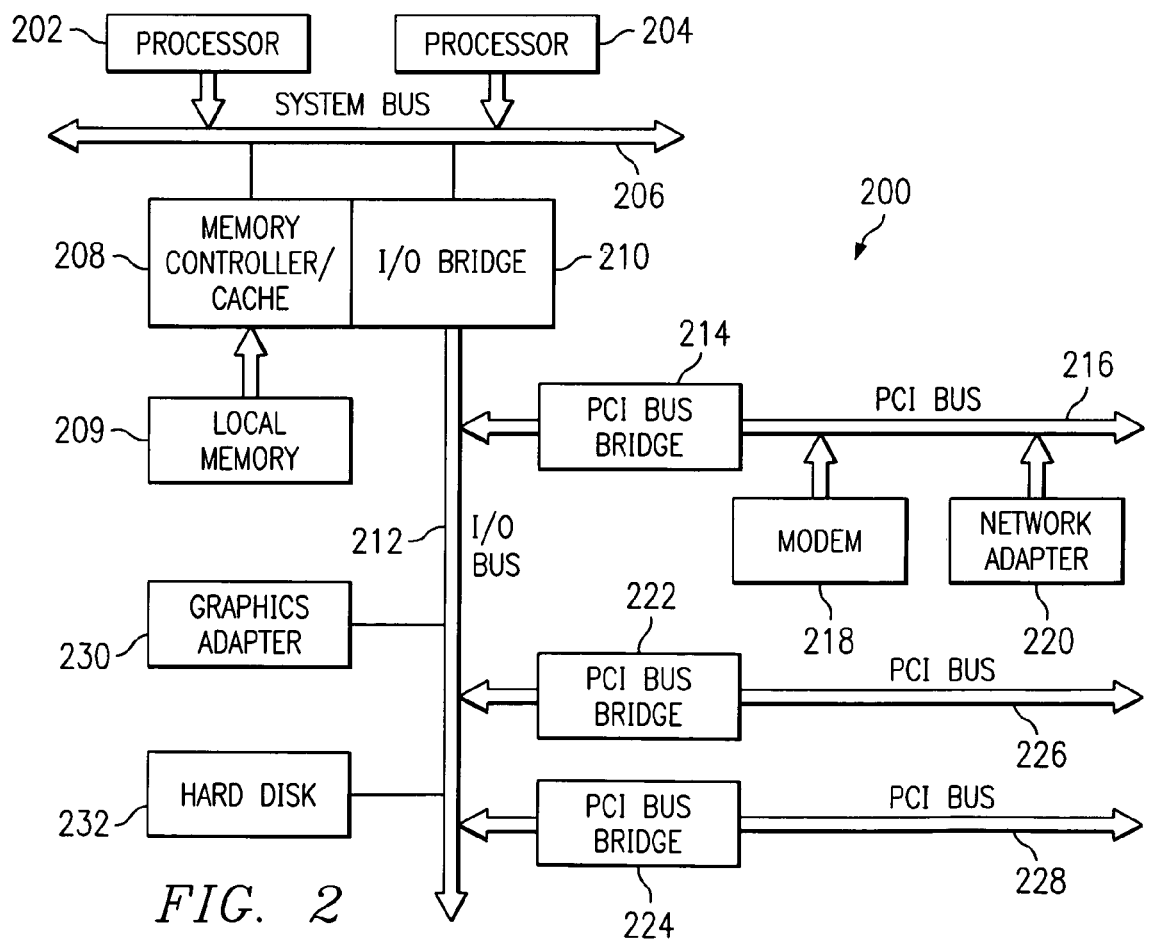
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
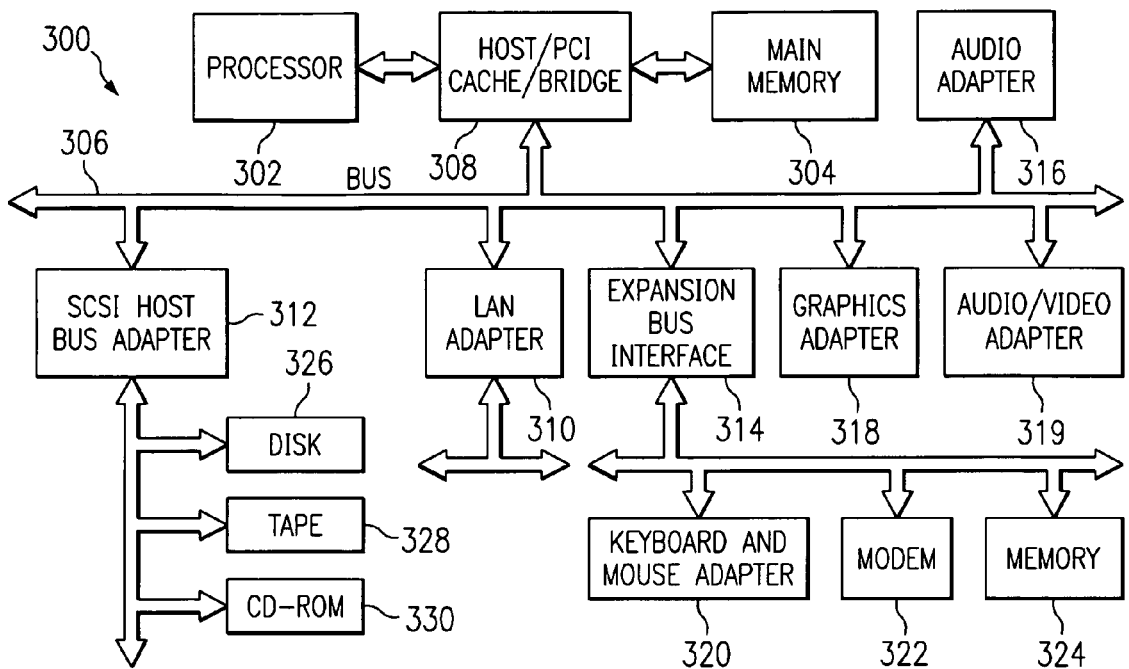
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an apparatus and method to reconstruct a program trace, obtained from a simulation of a computer operation, back to an executable program. The executable program may then be run on a new computer system such that the simulation run of the program and the final computer run of the program both have similar run characteristics to thereby provide a true comparison for analyzing the operation of the computer.

An instruction trace consists of a linear sequence of instructions (and memory addresses for data) that is captured during the execution of a program on an existing computer system. Only memory addresses are captured since if data were to be captured then the traces may get to be quite extensive with regard to required storage capacity.

For example, even a simple benchmark, such as dhrystone requires a trace of millions of instructions. The Dhrystone benchmark is a very small synthetic program whose code and text segments easily fit into their respective caches. The benchmark does not test memory or I/O bandwidth and issues no system calls. The benchmark is heavily lopsided toward string handling and spends more than one third of all CPU time in the two C functions strcmp( ) and strcpy( ). Few real-life applications behave this way.

On the current generation of computers, such a trace of instructions may only take a few microseconds of execution. In order to capture and analyze the real performance of a design it is important to capture a trace for at least a few seconds of execution so that some realistic representation can be made of the execution behavior of the computer system. As a result, useful traces are generally in the order of hundreds of Megabytes (MB) when the trace only maintains the instruction and address information and not the actual data. If the data were to be added in the trace, it would either multiply the size of the trace by a significant factor or reduce the execution time captured by the trace.

It should be noted that an instruction trace simply captures the linear execution of the program as it executed when the program was run. To the contrary, a program has many conditionals in it that, depending on the data being processed, may make the program take different execution paths at different times the condition is executed. In other words, in order to recreate a program execution, one needs to recreate the possible data values that are addressed by the instructions from the data addresses that are available in the instruction trace. The present invention describes a linear complexity algorithm to recreate the data values accessed by the program so that a given execution trace can be reconstructed back to an executable program.

Figure 4:
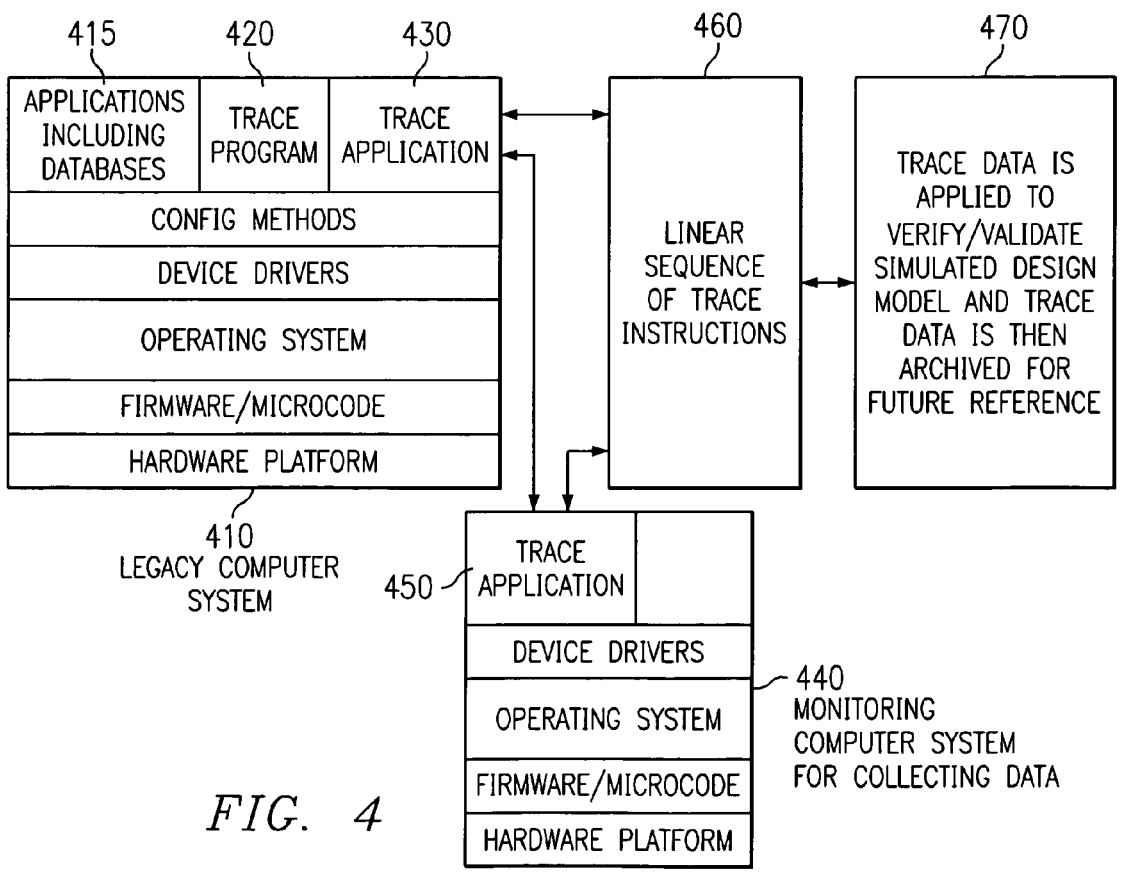
FIG. 4 is an exemplary block diagram illustrating a known method of generating a linear sequence of trace instructions from a trace program and then using this linear sequence to verify and validate the simulated design model of a computer system.

FIG. 4 shows a known method of generating a linear sequence of trace instructions from a trace program and then using this linear sequence to verify and validate the simulated design model of a computer system. A shown in FIG. 4, a legacy computer system 410 has one or more applications 415 (which may include databases), a trace program 420 and a trace application 430, along with configuration methods, device drivers, an operating system, firmware/microcode and a hardware platform. The trace application 430 is used to execute the trace program 420 on the one or more applications 415 and provide the trace information to the trace application 450 of the monitoring computer system 440. The trace application 450 compiles the trace data as a linear sequence of trace instructions 460. The linear sequence of trace instructions 460 may then be used to verify and validate the simulated design model 470.

Once the linear sequence of trace instructions 460 is used to verify and validate the simulated design model 470, the trace data is typically archived for future reference. However, it is not applied in the validation of new computer systems. Rather, an entirely new trace of the operation of the new computer system must be performed and the verification and validation performed using this new trace.

Figures 5, 6:
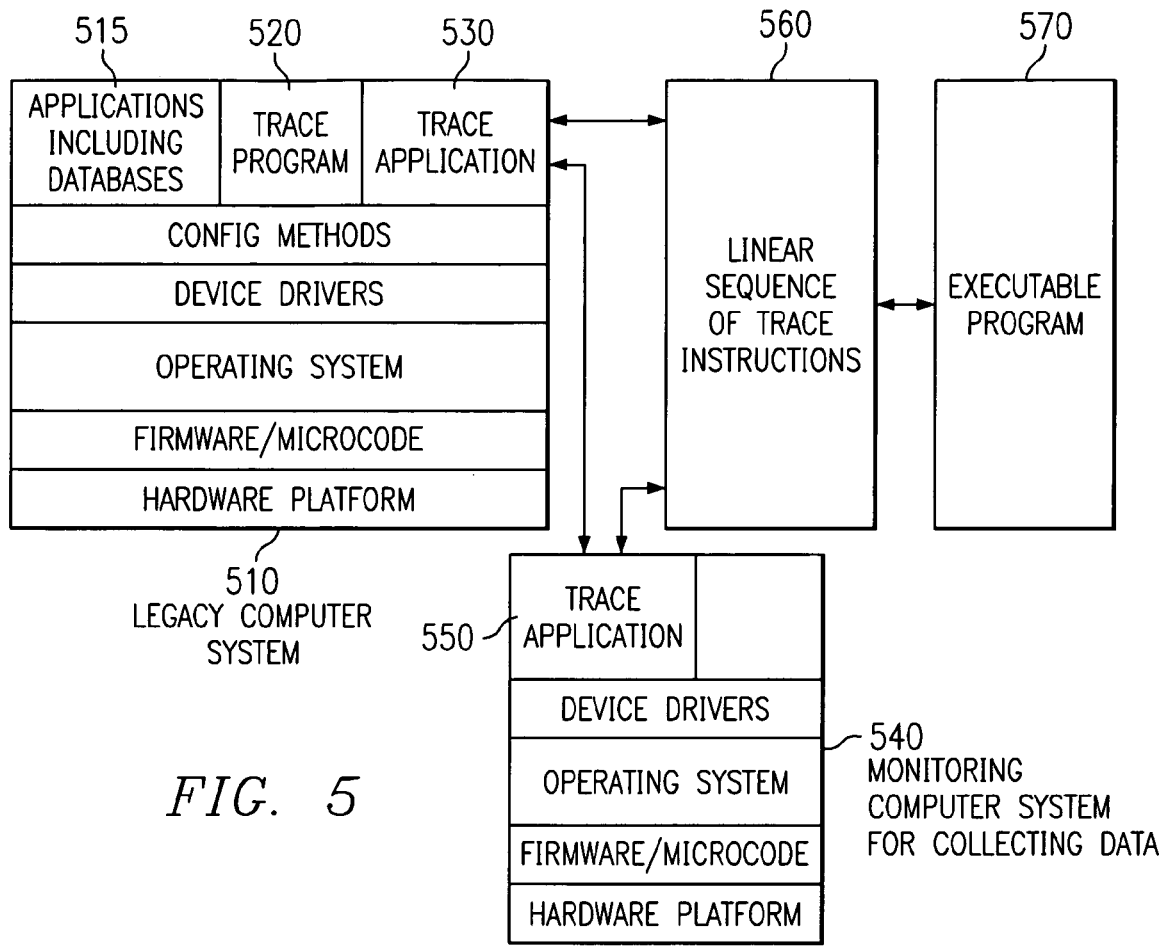
FIG. 5 is an exemplary block diagram illustrating the operation of the present invention.
FIG. 6 is a simplified example of source code.

FIG. 5 is an exemplary diagram illustrating the mechanism of the present invention. As shown in FIG. 5, elements 510–560 are similar to elements 410–460 in FIG. 4. That is, with the present invention, the performance of the trace and generation of the linear sequence of trace instructions is similar to that of the known method. The present invention, however, enhances the known method by converting the linear sequence of trace instructions 560 into an executable program 570. This executable program 570 may be used to verify and validate the simulated design model and may further be used to verify and validate other computer systems since the executable program 570 recreates the data values used in the original trace, as discussed in greater detail hereafter.

The present invention converts the linear sequence of trace instructions 560 to an executable program 570, in a preferred embodiment, using the following methodology. First, the trace instructions are traversed from the beginning of the trace. Each load register is replaced with a unique label if the memory address referenced by the load register is the same. Thus, for example, the load instruction "LD R1, R2 [offset]" may be used to load data into register R1 that is present at the address indicated by the value in register R2 plus an offset amount. In the present invention, the label for R1 having the data value from the address defined by the value of R2 plus the offset will be relabeled "N00001" and thus, the load instruction would be relabeled "LD N00001". The next load instruction, such as "LD R1, R3 [offset]" would be relabeled "LD N00002," and so on.

The new register labels are then propagated through the trace such that each use of the register number in subsequent instructions within the registers "live range" is now replaced with the new label. Thus, for example, if an instruction after the above "LD R1, R2 [offset]" instruction references the data value stored in register R1, such as ADD R7, R1, #23 (add R1 with constant 23 and place the result in R7) the reference to this register R1 will be replaced by the label N00001, i.e., ADD R7, N00001, #23.

This is a first step towards obtaining the values in the registers. By providing new register labels and propagating them throughout the trace, the two address spaces (memory addresses and temporary storage locations (registers)) are flattened to one linear address space. Having one address space makes it easier to track the values throughout the trace.

The register live range is a range of trace instructions occurring between an instruction that loads the register data value and a subsequent load instruction that loads a new data value in the register. When a new load operation occurs to the register, or some other operation that puts a new value in that register, a new data value is present in the register and thus, the previous data value, and therefore the previous register label, would be incorrect if it were propagated through the rest of the trace.

In addition to replacing load registers with unique labels, the present invention further replaces store registers, i.e. registers from which data is written into an address location in memory, with unique labels in the same manner. However, before creating a new label for the store register, a check is made to determine whether the store register references an existing memory address and label. That is, if a load instruction loads a value into register 1 (R1) from an address location denoted by R2 [offset], this register may be replaced with the label "N00001" and the load instruction would be "LD N00001."

If a subsequent store instruction is present in the linear sequence of trace instructions 560, the store instruction may store a data value from a register into the address referenced by register R1 above, e.g., R2 [offset]. In such a case, the same label for register R1, e.g., N00001, will be used to replace the register name of the register from which the data is stored. Again this helps to flatten the two memory spaces into a single linear memory space in order to simplify the recreation of the trace.

After having relabeled all load and store registers appropriately and propagated these new labels through the trace instructions, new labels are generated for each new destination register in all other instructions (other than load and store). These new labels are also propagated down through the live range of the registers. The above operations of relabeling the load registers, the store registers, and destination registers, and propagating these new labels through the trace may be performed in the same pass through the trace depending on which instruction is encountered.

The above relabeling operations essentially flatten all the operands into one address space with no reuse of register names to simplify the dependency search for branch resolution. During the performance of the relabeling operations above, register values of register indirect-operations are calculated and registers set with these values. The following is an example implementation of the calculation of register values of register indirect operations:

LD R1, R2 [0×4]=>R2=0×10000 if mem address=10004

This is an example where the register value is known because the instruction trace has the memory address for this instruction. This memory address is the sum of the register value (R2) and the offset (0×4). Therefore, the memory address is 10004. Thus, it can be deduced that the value of R2 must be 0×10000.

A table is created that records each register's value at different points in the program. An example of such a table is shown below in Table 1.

TABLE 1

Table of Register Values

| Address | Register/Memory Values | | | |
|---------|---------|---------|-----|--------|
| | N000000 | N00001 | ... | Nnnnnn |
| | | | | |
| | | | | |
| | | | | |
| | | | | |

In Table 1, Nnnnnn is the maximum label number for the given trace. This is the most straight forward implementation where the table has all the labels. However, all labels are live through the whole trace, Table 1 can be implemented as a linked list for more efficient memory usage.

After the relabeling operations above are carried out, the instructions in the linear sequence of trace instructions are traversed in a reverse direction to determine the data values that control the execution of the branches in that trace. As the trace instructions are traversed in the reverse direction, if a branch is taken, the condition register, e.g. N00250 in BE N00250 which stores the outcome of a condition or branch, is set equal to 0, otherwise it is set equal to −1 (all 1's). That is, if there is no previous use of this register in any preceding branch, the condition register is set to −1. If this register was used in a previous branch instruction, then the traversal through the preceding instructions would have already set the register to the correct value.

The value of the current condition register is then propagated up to the next branch instruction in the trace to thereby calculate the value of the registers up to the next branch instruction. This is achieved by simply reversing the operations of each of the instructions as the trace is traversed. The reverse operation performs the opposite function of the operation that is in the trace. For example, if the operation in the trace is a load, the opposite operation is a store, the opposite operation of an add is a subtract, and the like. For example, assume that a program started with a value of 10 in a register and then the program added 2 to that register. In order to calculate the original value, it is necessary to subtract 2 to get back to the original value of 10.

If it is the first time a condition register value is set to −1, for a branch not taken, it is possible that the value could have been some other non-zero value. This would show up as an incorrect value of a preceding branch condition register value as the instruction trace is traversed in the reverse direction from the last instruction to the first instruction. This can be corrected by setting the current branch condition register to the value that would yield the correct branch and then propagate that change down to the preceding computed values in an iterative manner.

For example, the condition registers could either have a zero value or some non-zero value. If it's zero then it can be easily seen from the trace because the branch would show up as a taken branch (if it's a BEQ or it will show up as a not taken for BNE). However, if it's not zero it can be any value from 1 to $2^{31}$ (for a 32 bit register) and it does not matter the first time whether it is 1 or any other non zero value since any non-zero value would cause the same result (branch not taken for BNE) for the branch.

However, as that condition register value is propagated up through the trace, and then if it gets used by another branch condition, the condition register values would have to be satisfied for this current branch. For example, say this branch is a BNE and the trace shows it to be taken. The value of this register would be less Since it started from a value of −1 ($2^{31}$) for this condition register and now the value of the register should be 0 for the trace to work properly.

The traversal of the instructions in the reverse direction and handling of branch conditions described above is then continued and repeated until the entire program trace is processed. The result of this processing is then assembled into a collapsed program using instruction addresses as the key and final values of registers calculated above.

The reverse traversal of the trace instructions can be best illustrated by using the example execution trace in FIG. 8 which is an example relabeled execution trace, according to the present invention, of the execution trace shown in FIG. 7. The execution trace shown in FIG. 7 is an execution trace of the program shown in FIG. 6. The example relabeled execution trace in FIG. 8 has all the registers and memory locations relabeled as described above. Note that the register indirect values that point to a memory location are also replaced by the NXXXXX label. For example, the store instruction at 0×10000348 has the register indirect portion (0×40 [r1]) replaced by a N00004 label and wherever that register indirect value is used in the trace, the N00004 label is used instead.

As the trace instructions are traversed in the reverse direction, the first conditional branch (BNE=Branch-not-equal-to-zero) is at address 0×10000390 which is recorded in the trace as not-taken because it is followed by the program's next sequential instruction in the trace. Had the branch been taken, the next sequential address in the trace would have been the target address of the branch, i.e., 0×10000368.

Knowing that the branch is not taken, the condition register (labeled as N00027) has to equal to zero. Furthermore, it means that N00025 and N00026 must have equal values. Therefore, the value of these two registers can now be set to be a symbolic value such as "a." Going up the trace, there is a load of a value from N00007 into N00026. This instruction can now be reserved to determine the value of N00007 and, in this case, can be reserved by simply setting N00007 with the value of N000026, which is "a." This may also be done for the instruction 0x10000384.

Next is the store instruction and which can be undone, or reversed, doing the opposite of store, which in this case, is to move the value of N00008 to N00024, i.e., "a." The next instruction is "add" which adds "0x1" value to the source register (N00023). The opposite of this operation would be to subtract that adder value (0x1) from the destination register (N00024). Hence on evaluating this instruction, the value of N00023 is determined to be "a-1" because N00024 was "a."

Working the trace up this way, at instruction 0x10000378, N00008=N00023="a-1." The next instruction is a store to N00004. The reverse, or opposite, operation of this would be a load of the value in N00004 to N00022. Since N00004 hasn't been set before with any value, it will be set to a new value, "b." Hence N00022=N00004="b". Next is a multiply operation which has an opposite operation being a divide. The result of the reverse operation would be that N00020=b/N00021 and N00021=b/N00020.

Next is a load instruction whose reverse operation is to store the value of N00021 to N00007 resulting in N00021=N00007. Similarly, N00020 at instruction 0x10000368 will result in N00020=N00008. Since the values of N00008 and N00007 is already known to be a-1 and a, respectively, these values can be substituted in the equations for N00021 and N00020 formed earlier.

The next instruction is a BNE and from the trace it is obvious that it's a taken branch. This means that the conditional register, N00019 is not equal to zero. The conditional register can therefore be set to -1 (or any other non-zero value).

Continuing on, the values of the remaining registers in the trace can be deduced in a similar manner as described above. At the end of the trace traversal, the final registers values that affect the control flow of the program would be:

$N00008=a-3$ and $N00007=a$

The other values would also be available based on the example description above. Given these symbolic values of the two registers, the value of symbol "a" can be set such that it results in positive values only, for example, in this case it can be set to any value equal to or greater than 3. Given this value, the program would function correctly when collapsed into an executable program such as that shown in FIG. 9. Since all the unique instructions are already in the trace, the instruction addresses are used as the sort key and the collapsed program is simply this sorted set of instructions with all the repeats of the same instructions removed. The register/memory values are available from Table 1 as they are determined by the reverse traversal of the relabeled execution trace.

Figure 10:
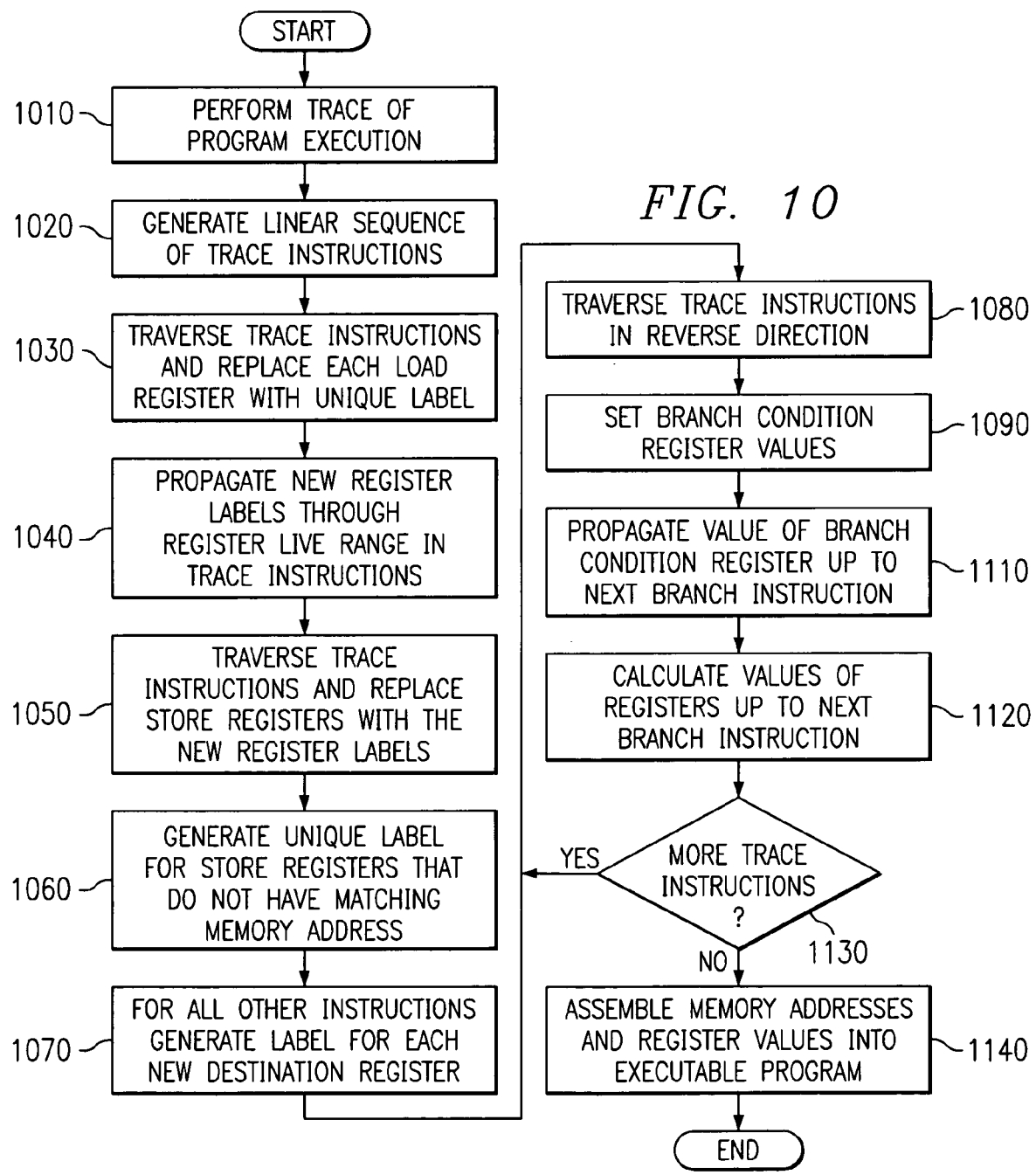
FIG. 10 is a flowchart outlining an exemplary operation of the present invention.

FIG. 10 is a flowchart outlining an exemplary operation of the present invention. As shown in FIG. 10, the operation starts with performing a trace of a program execution (step 1010). From the trace of the program, a linear sequence of trace instructions is generated (step 1020). The linear sequence of trace instructions is then traversed from the beginning of the trace and each load register is replaced with a unique label if the memory address is the same (step 1030). The new register labels are then propagated through the trace such that each of the register numbers in subsequent instructions within the register's live range is replaced with the new label (step 1040).

Then, the linear sequence of trace instructions is traversed and store registers are replaced with the new register labels if the memory address of the store register matches the memory address of a load register (step 1050). If the store register does not have a memory address that matches a memory address of a load register, a new register label is generated for the store register and propagated through the trace instructions (step 1060).

Then, for all other instructions, a new label is created for each new destination register and this label is propagated through the live range of the destination register (step 1070). The steps 1030–1070 may be performed sequentially or in parallel. For example, steps 1030–1070 may all be performed using one pass through the trace instructions.

Thereafter, the trace instructions are traversed in the reverse direction (step 1080). During the reverse traversal of the trace instructions, branch condition registers are set based on whether or not the branch is taken in the trace instructions (step 1090). The value of the branch condition registers is then propagated through the trace instructions up to the next branch instruction (step 1110). The values of the registers up to the next branch condition are calculated (step 1120). This may involve performing "undo" operations as described above.

A determination is then made as to whether the entire sequence of trace instructions has been processed (step 1130). If not, the operation returns to step 1080. Otherwise, the resulting memory addresses and register values are assembled into an executable program and stored for later use (step 1140). The operation then ends.

Thus, the present invention provides a mechanism by which a linear sequence of trace instructions may be converted into an executable program that may be used to check the operation of a plurality of computing devices. The present invention traverses the linear sequence of trace instructions to determine the values of registers in the trace instructions. These values, and memory addresses of the registers, are then assembled into an executable program that may be used in the analysis of the operation of one or more computing devices.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of recreating the execution of a program in a computing device, comprising:
estimating one or more data values in one or more registers;
using the estimated one or more data values to identify one or more operations performed by the program;

recreating the execution of the program based on the estimated one or more data values and the identified one or more operations;
performing a trace of the execution of the program;
traversing the trace frown a beginning of the trace to an end of the trace; and
replacing instances in the trace of register labels with unique labels during the traversal of the trace.

2. The method of claim 1, wherein estimating one or more data values in one or more registers includes:
processing the trace with the unique labels for the register labels in a reverse direction to estimate the one or more data values.

3. The method of claim 2, further comprising:
determining ifs branch in the trace is taken; and
setting a value of a condition register for the branch based on whether or not the branch is taken.

4. The method of claim 1, wherein replacing instances in the trace of register labels with unique labels includes replacing each load register name with a unique label and propagating the unique label of each load register throughout a live range of the remainder of the trace.

5. The method of claim 4, wherein replacing instances in the trace of register labels with unique labels includes replacing each store register name with a unique label and propagating the unique label of each store register throughout a live range of the remainder of the trace.

6. The method of claim 5, wherein the live range is a range of trace instructions occurring between load instructions to the same register.

7. The method of claim 5, wherein replacing each store register name with a unique label includes checking to determine whether the store register references an existing memory address and label previously encountered during the traversal.

8. The method of claim 7, wherein if the check indicates that the store register references an existing memory address and label, the existing label is used in replacement of the store register name.

9. The method of claim 5, wherein replacing instances in the trace of register labels with unique labels includes generating a unique label for each destination register name in the trace.

10. The method of claim 9, wherein replacing each load register name with a unique label and propagating the unique label of each load register throughout a live range of the remainder of the trace, replacing each store register name with a unique label and propagating the unique label of each store register throughout a live range of the remainder of the trace, and generating a unique label for each destination register name in the trace are performed in a single pass through the trace.

11. The method of claim 1, wherein estimating one or more data values in one or more registers includes calculating register values for register indirect operations in the trace and setting corresponding registers with the calculated values.

12. The method of claim 3, further comprising:
propagating the value of the condition register up to a next branch in the trace; and
calculating values for registers up to the next branch based on the value of the condition register.

13. The method of claim 12, wherein calculating the values for registers up to the next branch includes using reverse operations to determine the values for the registers.

14. The method of claim 1, wherein estimating one or more data values for one or more registers includes flattening a memory address space and temporary storage locations space into a single linear address space.

15. A computer program product recorded in a computer readable medium for recreating the execution of a program in a computing device, comprising:
first instructions for estimating one or more data values in one or more registers;
second instructions for using the estimated one or more data values to identify one or more operations performed by the program;
third instructions for recreating the execution of the program based on the estimated one or more data values and the identified one or more operations;
fourth instructions for performing a trace of the execution of the program;
fifth instructions for traversing the trace from a beginning of the trace to an end of the trace; and
sixth instructions for replacing instances in the trace of register labels with unique labels during the traversal of the trace.

16. The computer program product of claim 15, wherein the first instructions for estimating one or more data values in one or more registers includes:
instructions for processing the trace with the unique labels for the register labels in a reverse direction to estimate the one or more data values.

17. The computer program product of claim 16, further comprising:
fourth instructions for determining if a branch in the trace is taken; and
fifth instructions for setting a value of a condition register for the branch based on whether or not the branch is taken.

18. The computer program product of claim 17, further comprising:
sixth instructions for propagating the value of the condition register up to a next branch in the trace; and
seventh instructions for calculating values for registers up to the next branch based on the value of the condition resister.

19. The computer program product of claim 18, wherein the seventh instructions for calculating the values for registers up to the next branch include instructions for using reverse operations to determine the values for the registers.

20. The computer program product of claim 15, wherein the sixth instructions for replacing instances in the trace of register labels with unique labels include instructions for replacing each load register name with a unique label and instructions for propagating the unique label of each load register throughout a live range of the remainder of the trace.

21. The computer program product of claim 20, wherein the sixth instructions for replacing instances in the trace of register labels with unique labels include instructions for replacing each store register name with a unique label and instructions for propagating the unique label of each store register throughout a live range of the remainder of the trace.

22. The computer program product of claim 21, wherein the live range is a range of trace instructions occurring between load instructions to the same register.

23. The computer program product of claim 21, wherein the instructions for replacing each store register name with a unique label include instructions for checking to determine whether the store register references an existing memory address and label previously encountered during the traversal.

24. The computer program product of claim 23, wherein if the check indicates that the store register references an existing memory address and label, the existing label is used in replacement of the store register name.

25. The computer program product of claim 21, wherein the sixth instructions for replacing instances in the trace of register labels with unique labels include instructions for generating a unique label for each destination register name in the trace.

26. The computer program product of claim 25, wherein the instructions for replacing each load register name with a unique label and instructions for propagating the unique label of each load register throughout a live range of the remainder of the trace, instructions for replacing each store register name with a unique label and instructions for propagating the unique label of each store register throughout a live range of the remainder of the trace, and instructions for generating a unique label for each destination register name in the trace are executed in a single pass through the trace.

27. The computer program product of claim 15, wherein the first instructions for estimating one or more data values in one or more registers include instructions for calculating register values for register indirect operations in the trace and instructions for setting corresponding registers with the calculated values.

28. The computer program product of claim 15, wherein the first instructions for estimating one or more data values for one or more registers include instructions for flattening a memory address space and temporary storage locations space into a single linear address space.

29. A system for recreating the execution of a program in a computing device, comprising:
   means for estimating one or more data values in one or more registers;
   means for using the estimated one or more data values to identify one or more operations performed by the program;
   means for recreating the execution of the program based on the estimated one or more data values and the identified one or more operations;
   means for performing a trace of the execution of the program;
   means for traversing the trace from a beginning of the trace to an end of the trace; and
   means for replacing instances in the trace of register labels with unique labels during the traversal of the trace.

30. The system of claim 29, wherein the means for estimating one or more data values in one or more registers includes:
   means for processing the trace with the unique labels for the register labels in a reverse direction to estimate the one or more data values.

31. The system of claim 29, wherein the means for replacing instances in the trace of register labels with unique labels includes:
   means for replacing each load register name with a unique label; and
   means for propagating the unique label of each load register throughout a live range of the remainder of the trace.

32. The system of claim 31, wherein the means for replacing instances in the trace of register labels with unique labels includes:
   means for replacing each store register name with a unique label; and
   means for propagating the unique label of each store register throughout a live range of the remainder of the trace.

33. The system of claim 32, wherein the means for replacing instances in the trace of register labels with unique labels includes means for generating a unique label for each destination register name in the trace.

34. A method of tracing the execution of a program in a computing device, comprising:
   replacing register names for one or more registers in trace instructions with unique labels;
   propagating the unique labels through the trace instructions;
   determining a value for one or more branch condition registers in the trace instructions;
   propagating the value for the one or more branch condition registers through the trace instructions to calculate data values for the one or more registers; and
   assembling the data values for the one or more registers into an executable program.

* * * * *